(12) United States Patent
Rice

(10) Patent No.: US 8,296,193 B2
(45) Date of Patent: Oct. 23, 2012

(54) SUPPLIER DYNAMIC REFERENCE SYSTEMS AND METHODS

(75) Inventor: David Rice, Huntington Beach, CA (US)

(73) Assignee: Omacro, Inc., Huntington Beach, CA (US)

( * ) Notice: Subject to any disclaimer, the term of this patent is extended or adjusted under 35 U.S.C. 154(b) by 186 days.

(21) Appl. No.: 12/819,991

(22) Filed: Jun. 21, 2010

(65) Prior Publication Data
US 2011/0313888 A1 Dec. 22, 2011

(51) Int. Cl.
*G06Q 30/00* (2012.01)

(52) U.S. Cl. ............. 705/26.61; 705/26.1; 705/26.41; 705/26.43; 705/26.44; 705/27.1

(58) Field of Classification Search ................ 705/26.1, 705/26.41, 26.43, 26.44, 26.61, 27.1
See application file for complete search history.

(56) References Cited

U.S. PATENT DOCUMENTS

| | | | |
|---|---|---|---|
| 5,970,472 A * | 10/1999 | Allsop et al. | 705/26.81 |
| 6,272,472 B1 * | 8/2001 | Danneels et al. | 705/27.1 |
| 6,976,006 B1 * | 12/2005 | Verma et al. | 705/26.64 |
| 7,584,210 B2 | 9/2009 | Wight et al. | |
| 8,108,264 B1 * | 1/2012 | Davis | 705/26.3 |
| 2003/0171964 A1 * | 9/2003 | Center et al. | 705/8 |
| 2005/0187967 A1 | 8/2005 | Couch et al. | |
| 2007/0192168 A1 * | 8/2007 | Van Luchene | 705/10 |
| 2009/0006220 A1 | 1/2009 | Wight et al. | |

OTHER PUBLICATIONS

Anon., "American TV and Appliance of Madison Joins brandwise.com(SM) Merchant Network," PR Newswire, Oct. 29, 1999.*
Anon., "Clickthebutton and Active Buyer's Guide Team Up to Offer Powerful Comparison Shopping Service," Business Wire, Aug. 3, 2000.*
Anon., "Sidestepping Online Price Wars . . . The Peavy Magnet," Music Trades, vol. 150, No. 2, p. 94, Mar. 2002.*
Anon., "Tentoe, PriceGrabber Partner to provide Where-to-Buy, Marketing Content Services for Consumer Electronics Vendors Joint Efforts Will Give Vendors Ability to Easily Collect 'Where Sold' Product Information and Deliver 'Where-to-Buy' Retailer Referrals From Their Corporate Websites," PR Newswire, Sep. 7, 2004.*
Anon., "LaCrosse Footwear, Inc. Launches New Web Sites Danner and Lacrosse Sites Offer Simplified and Enhanced Online Shopping for Cosnumers and Dealers," PR Newswire, Sep. 22, 2006.*

* cited by examiner

*Primary Examiner* — Nicholas D Rosen
(74) *Attorney, Agent, or Firm* — Hani Z. Sayed; Rutan & Tucker, LLP

(57) ABSTRACT

Systems and methods for a supplier dynamic reference are provided. Some embodiments include a processor and a memory coupled to the processor for storing instructions. In various embodiments, the memory stores instructions causing the processor to provide product information to a consumer, process data to determine that the consumer wants to make a purchase, process data to enable a supplier to dynamically select a reseller of their products based on a predetermined criteria, and cause the processor to transmit data related to the selected reseller to the consumer. Some embodiments may include a database with product information and product reseller information, including an indication of which resellers sell each product and a selection system configured to select a reseller to provide to the consumer based on the consumer wanting to purchase the product and a reseller selection criteria, wherein the transmitter transmits reseller information to the consumer.

5 Claims, 7 Drawing Sheets

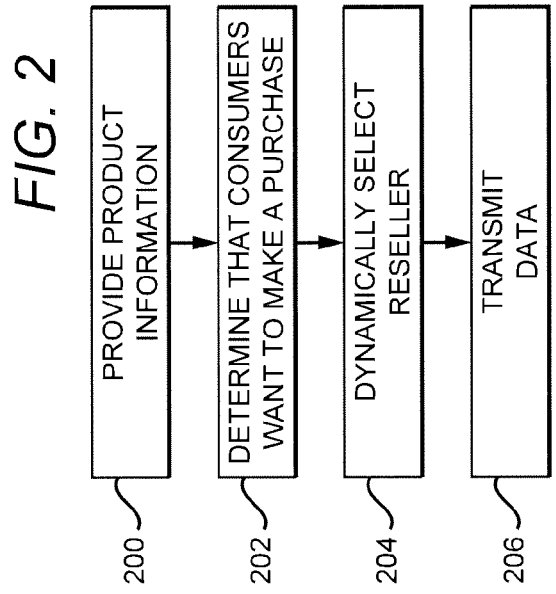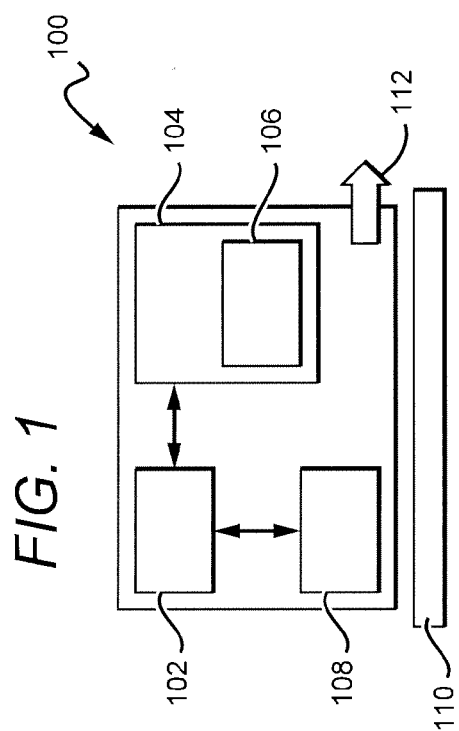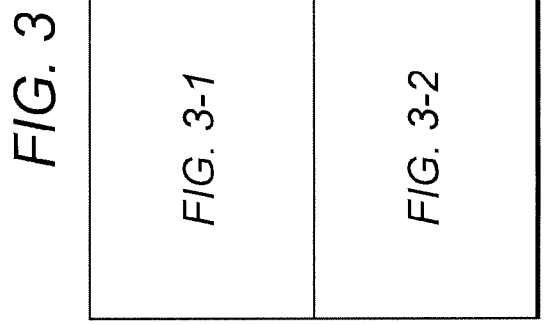

My Account  Sign Out  Report news                                                                                   Help  Take a Tour  Messages All Product  Companies  People  Google

[search          ] search

Products | Companies | People | News | Specials | Forums | Classified | More ▼

Home > My Account > Products

| Settings | Contact | Users | Links | Photos | Videos | Retailers | Service Centers | Reps | Products | Policies | Marketing |

Product Franchises (Learn More)

Create Product Franchise — 500

| Product Franchise | Products | Edit | Delete |
|---|---|---|---|
| Products | 92 | Edit | Delete |
| Replacement Parts | 687 | Edit | Delete |
| New Secret Products | 6 | Edit | Delete |
| Retired Products | 298 | Edit | Delete |

Price Schemas (Learn More)

Create Price Schema — 502

Add Product — 504     Upload Product File — 506

| Price Schema | Description | Currency | Edit | Delete |
|---|---|---|---|---|
| MSRP* | Manufactures Suggested Retail Price | USD | | |
| MAP | Minimum Advertised Price | USD | Edit | Delete |
| Dealer 1-5 | Dealer Cost 1 to 5 Units | USD | Edit | Delete |
| Dealer 6+ | Dealer Cost 6 or More Units | USD | Edit | Delete |
| National Accounts | Special National Accounts Price | USD | Edit | Delete |

Help & Info  Advertising  Take a Tour                                        Contact  Terms of Use  Privacy Policy

*FIG. 5*

My Account   Sign Out   Report news                                            Help   Take a Tour   Messages All   Product   Companies   People   Google

[          ] search

Products I Companies I People I News I Specials I Forums I Classified I More ▼

Home > My Account > Retailers > Manage Retailers

| Settings | Contact | Users | Links | Photos | Videos | Retailers | Service Centers | Reps | Products | Policies | Marketing |

[     ] Find   Filter Program ▼   Filter Status ▼   Filter Rep ▼   Select a format ▼   Export ☑ Change Status   ☑ Change Program   ☑ Expire > Additional Filter Options        Show [xx ▼] results per page:  1  2  3  4 ...35  next

| | Name | Program | Status | Rep | State | Country | Date Accepted |
|---|---|---|---|---|---|---|---|
| ☐ | Nashville Guitar | Regular Active Retailers | Pending Application | Music Network Reps | TN | United States | July 26, 2008 |
| ☑ | Guitar Center | National Account | Active | Direct | CA | United States | July 26, 2008 |
| ☐ | Handly's Music Place | Inactive Retailers | Expired | The Best Reps | TN | United States | July 26, 2008 |
| ☑ | PA/s Place | Extra Co-Op Accounts | Active | John Marketing | TN | United States | July 26, 2008 |

Help & Info   Advertising   Take a Tour                                    Contact   Terms of Use   Privacy Policy

*FIG. 6*

SUPPLIER DYNAMIC REFERENCE SYSTEMS AND METHODS

FIELD OF THE INVENTION

The field of invention is for disclosed systems and methods for supplier references and more particularly, to such systems that dynamically provide references to potential purchasers.

BACKGROUND

Internet marketing, web-marketing, online-marketing, or e-Marketing is the marketing of products or services over the Internet. By using the Internet, a marketer may have access to a global audience. Using the Internet allows marketers to provide an interactive marketing experience for potential consumers. For example, a marketer may be able to provide an immediate response to consumer questions without requiring a face-to-face sales force or even a telephone call center.

Some computing systems used for Internet marketing may use cloud computing. Cloud computing is a shift away from stand-alone, fully self-contained, computing systems. With cloud computing the users generally do not need knowledge, expertise or control of many of the details related to the technology infrastructure because that technology infrastructure is located "in the cloud." Generally, this infrastructure can be provided as a service over the internet, which may allow the service to be dynamically scalable.

While the Internet generally provides a global audience, some suppliers may wish to associate resellers with consumers in specific geographic areas, demographic groups, or some other criteria. Accordingly, it can be advantageous for suppliers to dynamically refer consumers to resellers based on various predetermined criteria that may be set by the supplier.

SUMMARY

Various embodiments of the systems and methods described herein are related to a supplier dynamic reference system. Some embodiments include a processor and a memory coupled to the processor storing instructions. These instructions can cause the processor to provide product information to a consumer, process data to determine that the consumer wants to make a purchase, process data to enable a supplier to dynamically select a reseller of their products based on a predetermined criteria, and cause the processor to transmit data related to the selected reseller to the consumer.

In an exemplary embodiment, multiple resellers are selected and the processor causes a transmitter to transmit data related to the selected multiple resellers to the consumer.

In an exemplary embodiment, a supplier's website presents product information to the consumer.

In an exemplary embodiment, the system generates code that is placed within the supplier's website code for a product webpage.

In an exemplary embodiment, the code generates a user interface.

In an exemplary embodiment, the user interface allows the consumer to select "buy now" or "dealer locator" and wherein the user interface provides data related to a reseller when "buy now" is selected and wherein a list of resellers within a predetermined distance of the consumer are provided when "dealer locator" is selected.

In an exemplary embodiment, the list generated includes a reseller name, stock status and prices with a hyperlink to the reseller's product detail webpage of the reseller's website and wherein the product detail web includes information on the product, including a picture, reseller's stock status, and logo.

In an exemplary embodiment, when a consumer selects "dealer locator" they may enter a zip code and a list of resellers within a predetermined distance of the zip code are provided.

In an exemplary embodiment, a consumer selects "dealer locator" by entering a location.

In an exemplary embodiment, the instructions cause the processor to allow for selection and de-selection of resellers associated with the supplier.

In an exemplary embodiment, a method for controlling a supplier dynamic reference system comprises providing product information to a consumer, determining that the consumer wants to make a purchase, dynamically selecting a reseller based on a predetermined criteria, and transmitting data related to the selected reseller to the consumer.

In an exemplary embodiment, a method can include selecting multiple resellers and transmitting data related to the multiple resellers selected to the consumer.

In an exemplary embodiment, a method can include a generated list that includes a reseller name, stock status and prices a hyperlink to the reseller's product detail, webpage of the reseller's website, and wherein the product detail web includes information on the product, including a picture, reseller's stock status, and logo.

In an exemplary embodiment, a method can include assigning a first reseller to a first group and assigning a second reseller to a second group. It may further include assigning a first consumer to the first group and a second consumer to the second group and wherein the first or second consumer only sees a reseller from that consumers group.

In an exemplary embodiment, a supplier dynamic reference system can include a database including product information and product reseller information, including an indication of which resellers sell each product, a transmission system that transmits product information to a consumer; and a selection system configured to select a reseller to provide to the consumer based on the consumer wanting to purchase the product and a reseller selection criteria, wherein the transmitter transmits reseller information to the consumer.

In an exemplary embodiment, an interface may allow suppliers and resellers to manage their options by accessing a cloud computing system.

Further features and advantages of the presently disclosed method and apparatus, as well as the structure and operation of various embodiments of the presently disclosed method and apparatus, are described in detail below with reference to the accompanying drawings.

BRIEF DESCRIPTION OF THE DRAWINGS

The disclosed method and apparatus is described in detail with reference to the following figures. The drawings are provided for purposes of illustration only and merely depict typical or example embodiments of the disclosed method and apparatus. These drawings are provided to facilitate the reader's understanding of the disclosed method and apparatus and are not to be considered as limitations of the breadth, scope, or applicability of the claimed invention. The appended claims should be reviewed to determine the breadth, scope, and applicability of the claimed invention. It should be noted that for clarity and ease of illustration, these drawings are not necessarily made to scale.

FIG. 5 is a block diagram illustrating an example webpage for a supplier dynamic reference system in accordance with the systems and methods described herein.

FIG. 6 is a block diagram illustrating an example webpage for a supplier dynamic reference system in accordance with the systems and methods described herein.

Figures 1, 3:
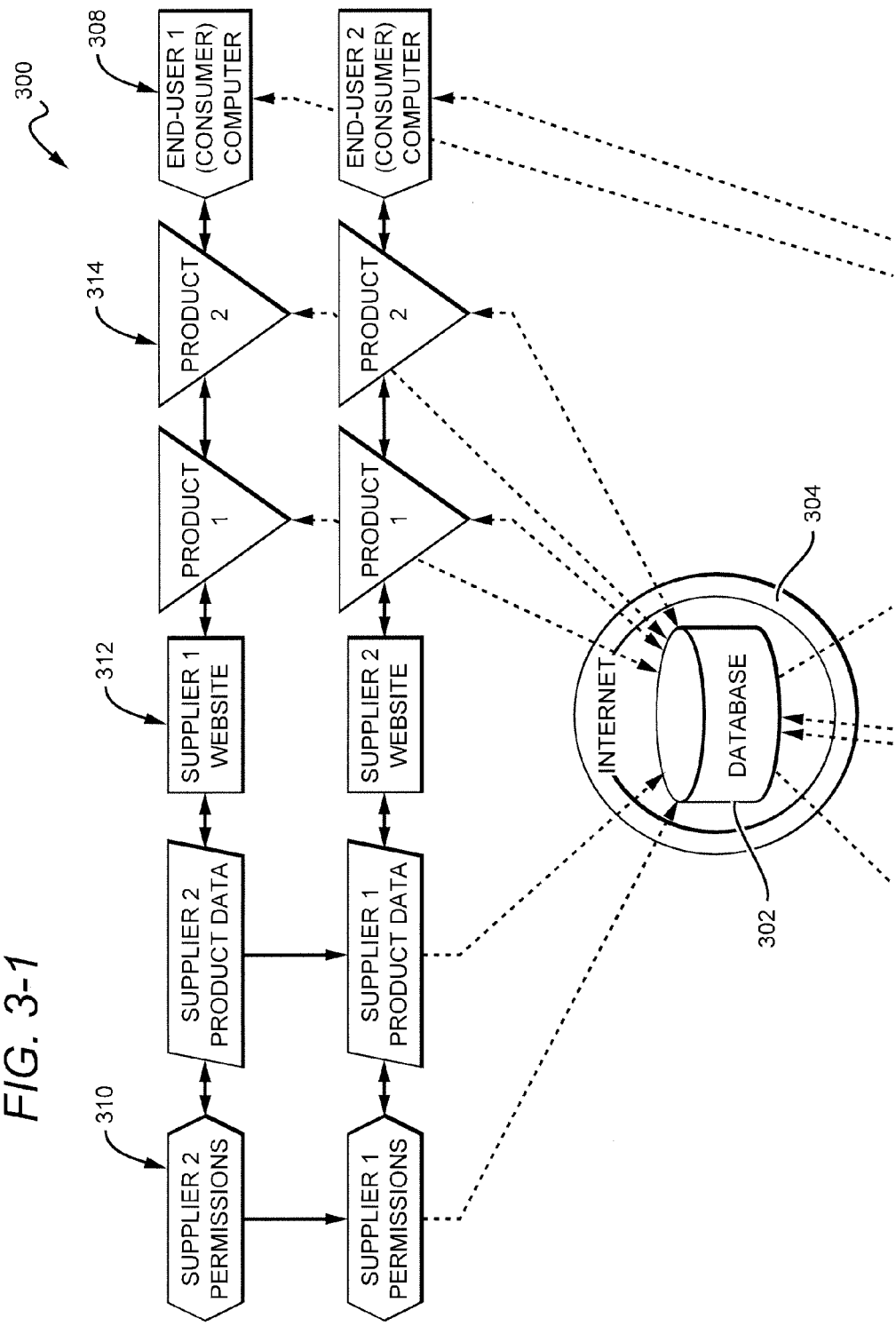
FIG. 1 is a block diagram illustrating an example supplier dynamic reference system in accordance with the systems and methods described herein.
FIG. 3 is a block diagram illustrating an example supplier dynamic reference system in accordance with the systems and methods described herein.

It should be understood that the disclosed method and apparatus might be practiced with modification and alteration.

DETAILED DESCRIPTION

Various embodiments of the systems and methods described herein are related to content management, social networking, or both. The systems and methods may include a dynamically scalable computing resource configured to increase or decrease computing capacity. The dynamically scalable computing resources can include processors, memory, and other computing resources. Additionally, the memory may be coupled to the processor for storing instructions and data. While various examples are given with respect to content management systems, it will be understood that the systems and methods described herein can also be configured to form a social networking system.

One environment in which the systems and methods described herein might be used is a web-based sales environment. Such an environment might include multiple computers capable of transmitting and receiving data from each other over the Internet.

The Internet is a global system of interconnected computer networks that use a standard Internet Protocol Suite (TCP/IP) to communicate. It is a network of networks and may include millions of private, public, academic, business, and government networks. These networks can be of a local, regional, national, or global scope and might be linked by a wide variety of data communication technologies.

Users may navigate the Internet using an inter-linked set of hypertext documents. These inter-linked hypertext documents can make up the World Wide Web (WWW). In some embodiments of the systems and methods described herein, a consumer may be provided with links to a set of resellers based on a predetermined criterion. For example, the consumer might be provided a link to a reseller's website.

In one example system, a consumer can access a supplier's website using the Internet. If the consumer wishes to make a purchase, they might select "Buy Now" or request additional information, such as reseller information. The requested additional information might be provided to the consumer over the Internet.

In many cases, Internet marketing may be relatively inexpensive. In many cases companies may reach a wide audience for a fraction of the cost of traditional advertising budgets. The nature of the medium can allow consumers to research and purchase products and services at their own convenience.

Internet marketers also have the advantage of measuring statistics easily and inexpensively. Nearly all aspects of an Internet marketing campaign can be traced, measured, and tested. The advertisers can use a variety of methods: pay per impression, pay per click, pay per play, or pay per action. Therefore, marketers can determine which messages or offerings are more appealing to the audience. The results of campaigns can be measured and tracked immediately because online marketing initiatives usually require users to click on an advertisement, visit a website, and perform a targeted action. Such measurement cannot be achieved through billboard advertising, where an individual will at best be interested, then decide to obtain more information at a later time.

FIG. 1 is a block diagram illustrating a simplified example supplier dynamic reference system 100 in accordance with one embodiment of the systems and methods described herein. The example system 100 includes a processor 102 that may be used to execute instructions and control some or all of the functions of the system 100. In some embodiments, processor 102 can be a microprocessor, microcontroller, digital logic, multiple processors, parallel processors, etc. Processor 102 may be implemented in an integrated circuit or programmable logic such as a field programmable gate array (FPGA) or other programmable logic device.

A memory 104 can be coupled to the processor 102. The memory may store instructions 106 or data. Instructions 106 can cause the processor to perform the functions of the system 100. For example, in some embodiments instructions 106 can cause processor 102 to provide product information to a consumer. Processor 102 may also process data to determine that the consumer wants to make a purchase and process data to enable a supplier to dynamically select a reseller from multiple resellers of their products based on predetermined criteria. Additionally, the instructions may cause processor 102 to transmit data related to the selected reseller to the consumer.

A number of criteria might be used to select a reseller. For example, resellers may be selected by geographic area. In some examples, multiple resellers might cover a given area. In some examples, a geographic area might be a city, a county, a state, several states, or an entire country. In some cases, multiple countries might make up a geographic area. Additionally, it will be understood that geographic areas might or might not follow political boundaries. In other words, a geographic area might split a city, county, state, country, etc. It might be a subset of one of these or a combination of portions of multiple cities, counties, countries, etc.

Resellers might also be selected based on overall sales. For example, resellers with more sales might be preferred resellers. In one embodiment, the top two, three, or four resellers might be presented to a consumer.

In some embodiments, other selection criteria might be used. For example, a supplier might have historical information relating to resellers that a particular consumer prefers. The consumer may have made purchases from a particular reseller or group of resellers in the past. Accordingly, the system might direct that consumer to that reseller or resellers.

Conversely, a supplier might be aware of a reseller that a consumer had a previous bad experience with in the past. This information might be stored in a database, for example. The supplier might avoid providing information on a reseller that a consumer has had a bad experience with and might select other resellers instead. In this way, the supplier might avoid having the consumer associate the previous negative experience with the supplier's company.

For example, processor 102 might cause the transmission by controlling a transmission device 108. In various embodiments, transmission device 108 may be a network card connected to a computer network 110. The network card may be installed in a computer containing processor 102 or built into a motherboard in which processor 102 is installed, for example. Transmission device 108 may be a transmitter, transceiver, or other type of transmission device. For example, processor 102 may be connected to a network, e.g., the Internet, wirelessly.

An antenna may be connected to the transmission device to radiate energy from the transmission into space. This transmission might be received by a wireless router or other receiving device, which in turn may provide a network connection to system 100 that includes a processor 102.

In an example embodiment, processor 102 may control signals to transmission device 108 that activate transmission of data. Additionally, data to be transmitted can be written by processor 102 to transmission device 108. Transmission device 108 may then transmit this data.

In some embodiments, multiple resellers may be selected. Processor 102 may control transmission device 108 to cause device 108 to transmit data related to the selected multiple resellers to the consumer. A website can present product information to the consumer, for example, when the transmission device includes a network card connected to the Internet.

In some embodiments, system 100 may generate code 112 that can be placed within the website code for a product webpage. For example, instructions 106 may cause processor 102 to generate the code 112. The custom code snippet 112 may generate a user interface that can be shown to end-users (e.g., general public consumers) that allow them to choose "Buy Now" and/or "Dealer Locator." For example, when an end-user selects either "buy now" or "find dealer," that selection can cause a code snippet to be executed. The code snippet calls the system to retrieve appropriate data and then presents that data to the end user.

An example of a user interface which allows the consumer to select "buy now" or "dealer locator" which may provide data related to a reseller when "buy now" is selected and a list of resellers within a predetermined distance of the consumer when "dealer locator" is selected. It will be understood by those skilled in the art that the list of resellers provided when "buy now" is selected may include one reseller, multiple resellers, or no resellers. Additionally, the predetermined distance might be 5 miles, 10 miles, 25 miles, 50 miles, 100 miles, 500 miles, etc. Additionally, the distance might be 5 kilometers, 10 kilometers, 25 kilometers, etc. The distance might also be provided by the user and predetermined immediately prior to the search. The input might be selected from a list provided as a pull-down menu on a website, for example, or might be input as a numeric value by the user.

In some embodiments, the list generated may include a reseller name, stock status, prices and a hyperlink to the reseller's product detail webpage of the reseller's website, and wherein the product detail web includes information on the product, including a picture, reseller's stock status, and logo. This may occur, for example, when the consumer chooses "buy now." Additionally, in some embodiments, the reseller's stock status and product detail hyperlinks may be reported by the reseller to the system daily, weekly, or real-time updates through uploads and or API interface.

In some embodiments, when a consumer selects "dealer locator" they may enter a zip code and a list of resellers within a predetermined distance of the zip code are provided. A consumer might select "dealer locator" simply by entering a location. For example, a location may be entered by entering a zip code, entering a city and state, entering longitude and latitude, or any other method of denoting location.

In various embodiments, the instructions may cause the processor to allow for selection and de-selection of resellers associated with the supplier. For example, some embodiments allow for selection and de-selection of resellers associated with the supplier to displayed to End-Users who use the interface options on a Product by Product basis.

Figures 2, 3:
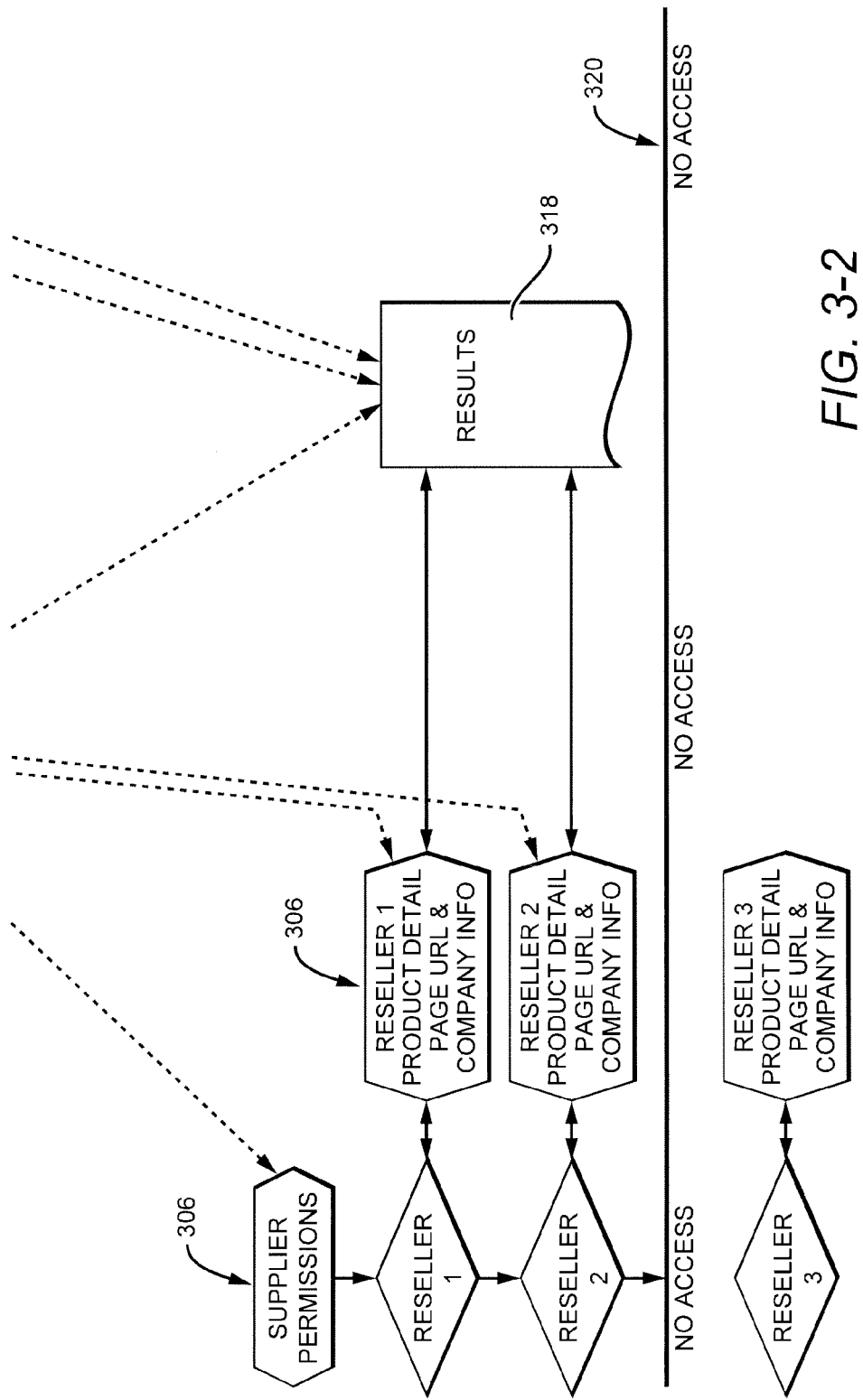
FIG. 2 is a flow diagram illustrating an example method for supplier dynamic reference system in accordance with the systems and methods described herein.

FIG. 2 is a flow diagram illustrating an example method for supplier dynamic reference system in accordance with the systems and methods described herein. The example method for controlling a supplier dynamic reference system can include step 200 of providing product information to a consumer. The product information can be provided by, for example, a supplier's website. The supplier's website can include product information such as product name, description, picture, suggested retail price, quantity available, etc. In some embodiments, product information might also be provided by one or more reseller websites. The resellers website might include the same information as the product supplier's website. It might also include an actual price, which might be the same or different from the suggested retail price. (In some systems the reseller's price or other information might be transmitted back to the system and included on the supplier's website.)

In step 202, the method determines that the consumer wants to make a purchase. For example, the method may include requesting data from a consumer to determine if the consumer would like to "buy now" or use a "dealer locator." This data might be requested using one or more "buttons" on a website. These buttons can be selected by the consumer at, for example, a supplier website, using a mouse or other computer input device. When a consumer provides input such as "buy now" or "dealer locator" this can cause the system to present other webpages to the consumer. For example, the selection can cause a code snippet to execute which then calls the system to retrieve appropriate data and present that data to the end user. Such as a webpage that processes a purchase (buy now) or a website, that provides reseller name, address, telephone, or other contact information (dealer locator).

In some embodiments, a custom generated code snippet may provide a web based user interface that executes when a user selects to make a purchase or find a dealer. Additionally, execution of the code snippet may retrieve data related to the user selection.

In step 204, the method dynamically selects a reseller based on predetermined criteria, as discussed above. For example, the method can include generating a list that includes a reseller name, stock status, prices, and a hyperlink to the reseller's product detail webpage of the reseller's website and wherein the product detail web includes information on the product, including a picture, reseller's stock status, or a logo.

Information on the selected reseller or resellers may be provided using a webpage and may be integral with the webpage or pages provided based on a "buy now" or "dealer locator" selection by the consumer, as discussed above. For example, if the consumer selects "buy now", that might cause a purchase directly from the supplier. Alternatively, however, it might provide the consumer with a reseller's web purchase page. In another example, the dealer locator page might link a consumer to a list of resellers, a map illustrating reseller locations, or a webpage with reseller webpage links. One or more of these data presentations might be available in some embodiments.

In step 206, the method transmits data related to the selected reseller to the consumer. In some embodiments, the data may include data related to selecting multiple resellers and transmitting that data to the consumer. For example, in some systems a website might be used to present product information to the consumer. In some embodiments, the system can generate code that is placed within the website code for a product webpage in an automated manner.

In various embodiments, the method can include assigning a first reseller to a first group and assigning a second reseller to a second group. Additionally, the method can assign a first consumer to the first group and a second consumer to the second group and wherein the first or second consumer only sees a reseller from that consumer's group.

FIG. 3 is a block diagram illustrating an example supplier dynamic reference system 300 in accordance with the systems and methods described herein. In some embodiments a supplier dynamic reference system 300 can include a database 302 including product information and product reseller information, including an indication of which resellers sell each product. A transmission system, such as the Internet 304, may transmit product information to a consumer 308.

In some embodiments, a selection system 306 can be configured to select a reseller to provide to the consumer 308 based on the consumer wanting to purchase the product and a reseller selection criteria. Selection may be based on supplier permission information. For example, suppliers may allocate reseller permission based on geographic territories. Resellers may be given a territory and consumers may be linked to a reseller based on where they are located, e.g., in which territory they are located.

The transmitter transmits reseller information to the consumer, for example, over the Internet 304. Some systems can include an interface that allows suppliers and resellers to manage their options by accessing a cloud computing system. Additionally, some systems can generate code that provides a web-based user interface.

In some embodiments, when an end-user chooses "dealer locator" interface option by entering their zip code, they are dynamically presented with a list of reseller companies. The list illustrates reseller names with direct hyperlinks to the reseller's product detail pages within the reseller's website that shows the supplier's product. The list also shows reseller's stock status, logo and hyperlink to access a geographical map of the reseller's location(s), information on the product including picture. The reseller's stock status and product detail hyperlinks are reported by the reseller to the system daily, weekly, or real-time updates through uploads and or API interface. Geographic MAP information (address) is provided by a reseller user account and or daily, weekly or real-time updates through upload and or API interface.

Additionally, in some examples, suppliers have the ability through a series of control options within the administration area of the system to select and deselect resellers associated or displayed to end-users who use the interface options on a product by product basis. The system might also be a real-time solution with, for example, full import, export and API access of most data (product info, user info, etc). The system may also have the ability to manage many products including stylized products. In some embodiments, products can be added/modified singularly, bulk uploaded by XML, Excel, CSV, etc. or by API. Additionally, suppliers can have multiple groups and assign resellers to one of the groups.

Referring back to FIG. 3, suppliers 310 may provide permission information, product data, product stock information, etc. to database 302. Information may also be provided to the public by supplier websites 312. For example, consumers 308 may find products 314 from supplier websites 312. Additionally, consumers 308 may be provided with various reseller information 316 based on supplier permissions 306.

Permissions may deny access to some resellers, such as reseller 3. This is indicated by the "no access" line 320.

The results 318 provided to consumers 308 can include information from database 302, reseller product information 316. For example, each reseller (dealer) that has permission might provide product information on a product website. This product information may include, for example, specific pricing provided by the reseller that might vary from one reseller to the next.

FIGS. 4-7 illustrate example web based pages. These pages include a "Buy Now" or "Find a Dealer" webpage illustrated in FIG. 4, a product franchise webpage illustrated in FIG. 5, a reseller webpage illustrated in FIG. 6, and a "Buy Now" webpage illustrated in FIG. 7. Each of these example web based retail pages may be used as part of a system that implements the systems and methods described herein.

Figure 4:
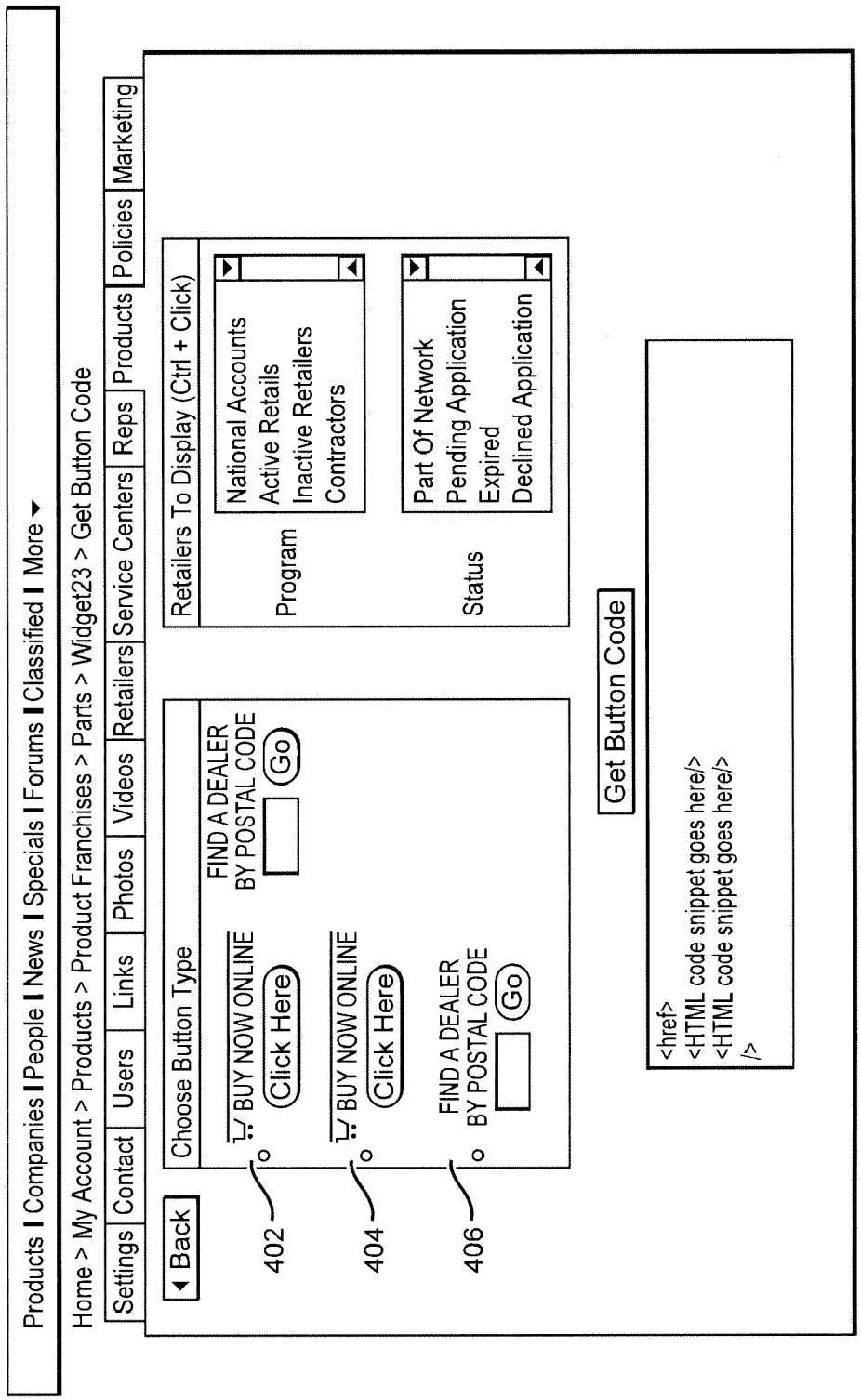
FIG. 4 is a block diagram illustrating an example webpage for a supplier dynamic reference system in accordance with the systems and methods described herein.

Referring now to FIG. 4, a user may select buy now, find a dealer 402; buy now online 404, or find a dealer 406. Buy now, find a dealer 402 allows a consumer to be directed directly to a resellers buy now page. Buy online 404 can allow a consumer to buy online from a reseller. Find a dealer 406 allows a consumer to access a local reseller website and potentially do additional research on a product at the reseller site.

Referring now to FIG. 5, a supplier may create product franchises 500 and price schema 502 using a web based interface. Additionally, products 504 may be added and product data 506 may be uploaded to a computer system using a web-based interface. The price schema 502 data on the webpage might include data related to manufacturer's suggested retail price, minimum advertised price and reseller cost. Additionally, reseller cost might vary based on the number of units purchased. For example, a breakdown from 1-5 units or 6+ units is illustrated in FIG. 5. Other breakdowns are also possible. Some may include more price points, e.g., 1-5, 6-10, 11-20, 21-100, 500+, etc.

Additionally, certain information might be provided related to national accounts. National accounts might relate to resellers that have a national presence. Such resellers might buy in large quantities and accordingly, might be given special volume pricing. This may be tracked using, for example, a web based system as illustrated in FIG. 5. The web based system illustrated may allow a supplier to edit information related to a reseller. Additionally, it might allow a supplier to add or delete a reseller.

Referring now to FIG. 6, the FIG. 6 illustrates an example webpage that might be used by a supplier to manage resellers. Such a page might list the resellers, any programs they are involved in, the resellers status, the name of the reseller's representative, geographic location of the reseller, such as state and country, and the date the reseller was accepted by the supplier.

As illustrated in FIG. 6 the webpage might allow for various data filtering options. For example, a user of the system might filter based on name, program, status, representative, state, country, date, etc. Additionally, the underlying database might be searched, the number of results per page may be varied, and different page numbers might be accessed.

Figure 7:
FIG. 7 is a block diagram illustrating an example webpage for a supplier dynamic reference system in accordance with the systems and methods described herein.

Referring now to FIG. 7, a buy now webpage is illustrated. The buy now webpage might provide a consumer with a reseller name, stock status for a product, price and a "Buy Now" button that allows the consumer to immediately begin a product order process.

While various embodiments of the method and apparatus have been described above, it should be understood that they have been presented by way of example only, and not of limitation. Likewise, the various diagrams might depict an example of an architectural or other configuration for the disclosed method and apparatus, which is done to aid in understanding the features and functionality that might be included in the method and apparatus. The disclosed method and apparatus is not restricted to the illustrated example architectures or configurations, but the desired features might be implemented using a variety of alternative architectures and configurations. Indeed, it will be apparent to one of skill in the art how alternative functional, logical or physical partitioning and configurations might be implemented to implement the desired features of the disclosed method and apparatus. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or "the like", and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "module" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

What is claimed is:

1. A method for controlling a supplier dynamic reference system, comprising:
    utilizing a computing system including a processor and memory coupled to a processor storing instructions;
    providing product information to a consumer;
    determining that the consumer wants to make a purchase;
    dynamically selecting a reseller from multiple resellers based on predetermined criteria, the criteria including at least one of geographic area, consumer preferences, or reseller sales volume;
    transmitting data related to the selected reseller to the consumer;
    assigning a first reseller to a first group and assigning a second reseller to a second group; and
    assigning a first consumer to the first group and assigning a second consumer to the second group, wherein the first or second consumer only sees a reseller from that consumer's group;
    and wherein at least one of the assigning steps is performed by the computing system.

2. The method of claim 1, further comprising selecting multiple resellers and transmitting data related to the multiple resellers selected to the consumer.

3. The method of claim 1, further comprising using a website to present product information to the consumer and using a system to generate code that is placed within the website code for a product webpage in an automated manner.

4. The method of claim 1, further comprising requesting data from a consumer to determine if the consumer would like to "buy now" or use a "dealer locator."

5. The method of claim 1, further comprising generating a list that includes a reseller name and a hyperlink to the reseller's product detail webpage of the reseller's website, and wherein the product detail webpage includes information on the product, including a picture, reseller's stock status, or logo.

* * * * *